C. J. & J. COSTELLO.
MUSIC NOTE BLOCK.

No. 104,833. Patented June 28, 1870.

Witnesses:
Arthur O'Neill
Emile Motz

Inventors:
Charles J. Costello
John Costello

United States Patent Office.

CHARLES J. COSTELLO, OF KINGSTON, AND JOHN COSTELLO, OF NEW YORK, N. Y.

Letters Patent No. 104,833, dated June 28, 1870.

IMPROVEMENT IN MUSIC-NOTE BLOCKS.

The Schedule referred to in these Letters Patent and making part of the same.

We, CHARLES J. COSTELLO, of Kingston, county of Ulster and State of New York, and JOHN COSTELLO, of the city, county, and State of New York, have invented certain Improvements in Music-note Blocks, representing the rudiments of music, for the instruction and amusement of children, of which the following is a specification.

The nature of our invention consists in preparing blocks of wood or equivalent material, of cubical form, and painting the sides of each cube in different colors, numbering the blocks, and writing on the faces of said blocks certain characters used in music, so that the blocks, when arranged in numerical order and of uniform color, will present a sheet of music containing a primary lesson in the art, and, by turning the blocks over, so as to again represent a sheet of uniform, but different color, will represent a second music-lesson, and so on, from one to eight or more lessons, as we will further explain by reference to the accompanying drawing, in which—

Figure 1:
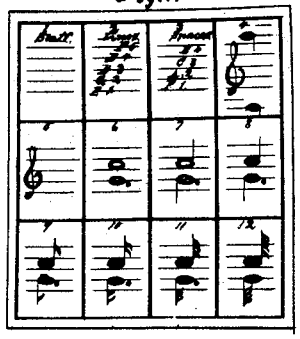
Figure 1 represents face 1 or twelve blocks of uniform color, representing the staff-lines, spaces, letters, ledger-lines, the different qualities of notes used in music, viz: The whole, half, quarter, eighth, sixteenth, thirty-second, and sixty-fourth notes.
Figure 2:
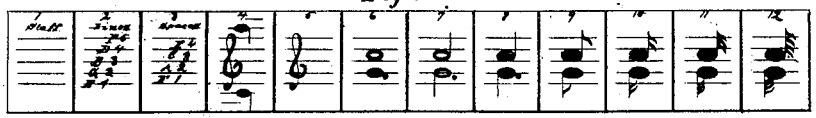
Figure 2 represents the said blocks removed from the case and arranged in line.
Figure 3:
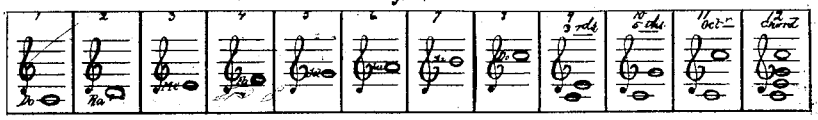
Figure 3 represents face 2, showing the complete scale of C major, treble clef, with its syllables and lettess, its thirds, fifths, octave, and chords.
Figure 4:
Figure 4 represents face 3, showing twelve of the principal keys, their names, by letters, and their signatures by sharps and flats; also, the different varieties of time in common use.
Figure 5:
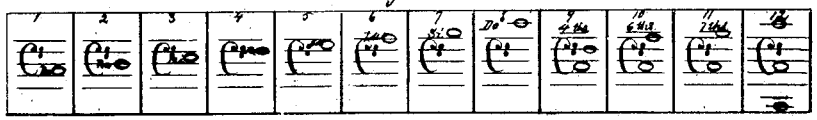
Figure 5 represents face 4, showing the complete scale of C major, bass clef, with its syllables and letters, its fourths, sixths, sevenths, and double octave.
Figure 6:
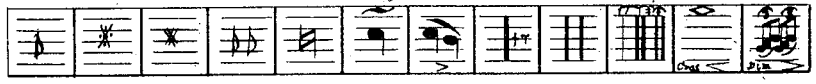
Figure 6 represents face 6, or the opposite ends of said blocks, showing the signs used to designate the sharp, double-sharp, flat, double-flat, natural, turn, slur, direct bar, double-bar, first and second ending, triplet, swell, diminuends, and crescendo.
Figure 7:
Figure 7 represents face 5, or the blocks on end, showing the various rests, viz: Six-bar, four, and two-bar rests, also the rest corresponding with the different quality of notes used in music, together with the staccato, repeat, and final ending.

We are aware that patents have been granted for alphabet-blocks, to aid in teaching children a knowledge of the alphabet, to spell and pronounce articulate sounds, in which the organs of speech are employed, and being entirely different from the intent and nature of our invention; we do not claim such, as our invention is intended as a medium for operating a machine, instrument, or mechanical contrivance, in which the hands, or hands and feet, are employed to produce harmonic sounds, and make, as it were, the piano-forte speak, while it affords instruction and amusement to children.

What we claim as our invention, and desire to secure by Letters Patent, is—

The series of blocks, marked or printed with musical characters and differently colored on their several faces and numbered, so that the corresponding faces of like color, in the whole series, arranged as set forth, shall respectively constitute representations of elementary music lessons, substantially as herein specified.

In testimony whereof we have hereunto set our signatures this 29th day of April, 1870.

CHARLES J. COSTELLO.
JOHN COSTELLO.

Witnesses:
ARTHUR NEILL,
EMILE MOLTZ.